United States Patent
Bosetti et al.

(10) Patent No.: US 9,650,275 B2
(45) Date of Patent: *May 16, 2017

(54) INTEGRATED PROCESS FOR THE PRODUCTION OF BIO-OIL FROM SLUDGE COMING FROM A WASTEWATER PURIFICATION PLANT

(75) Inventors: Aldo Bosetti, Vercelli (IT); Daniele Bianchi, Arese (IT); Giuliana Franzosi, Novara (IT)

(73) Assignee: ENI S.P.A. (IT)

( * ) Notice: Subject to any disclaimer, the term of this patent is extended or adjusted under 35 U.S.C. 154(b) by 388 days.

This patent is subject to a terminal disclaimer.

(21) Appl. No.: 14/002,321

(22) PCT Filed: Feb. 24, 2012

(86) PCT No.: PCT/IB2012/050850
§ 371 (c)(1),
(2), (4) Date: Oct. 2, 2013

(87) PCT Pub. No.: WO2012/117319
PCT Pub. Date: Sep. 7, 2012

(65) Prior Publication Data
US 2014/0020284 A1  Jan. 23, 2014

(30) Foreign Application Priority Data
Mar. 3, 2011  (IT) ............... MI2011A0333

(51) Int. Cl.
*C02F 11/10*  (2006.01)
*C10G 3/00*  (2006.01)

(52) U.S. Cl.
CPC ........... *C02F 11/10* (2013.01); *C10G 3/40* (2013.01); *C10G 2300/1003* (2013.01);
(Continued)

(58) Field of Classification Search
CPC ....................................................... C02F 11/10
(Continued)

(56) References Cited

U.S. PATENT DOCUMENTS

| 4,652,686 A | 3/1987 | Coenen et al. |
| 5,847,248 A * | 12/1998 | Bridle .............. C02F 11/10 208/13 |

(Continued)

FOREIGN PATENT DOCUMENTS

| WO | 2004087619 A2 | 10/2004 |
| WO | 2009083985 A2 | 7/2009 |

*Primary Examiner* — Ellen McAvoy
(74) *Attorney, Agent, or Firm* — Tarolli, Sundheim, Covell & Tummino LLP

(57) ABSTRACT

Integrated process for the production of bio-oil from sludge coming from a wastewater purification plant comprising the following steps: (a) sending wastewater to said purification plant obtaining sludge; (b) subjecting the sludge obtained in said step (a) to liquefaction, obtaining a mixture Including an oily phase consisting of bio-oil, a solid phase and an aqueous phase; (c) sending the aqueous phase obtained in said step (b) to said purification plant. The bio-oil (or "bio-crude") thus obtained can be advantageously used in the production of bio-fuels which can be used as such, or in a mixture with other automotive fuels. Otherwise, said bio-oil (or "bio-crude") can be used as such (bio-fuel), or in a mixture with fossil fuels (combustible oil, coal, etc.), for the generation of electric energy or heat.

13 Claims, 2 Drawing Sheets

(52) U.S. Cl.
CPC .............. *C10G 2300/1014* (2013.01); *C10G 2300/1018* (2013.01); *C10G 2300/208* (2013.01); *Y02P 30/20* (2015.11); *Y02W 10/37* (2015.05); *Y02W 10/40* (2015.05)

(58) Field of Classification Search
USPC .......................................................... 44/307
See application file for complete search history.

(56) References Cited

U.S. PATENT DOCUMENTS

| | | | | |
|---|---|---|---|---|
| 7,276,148 | B2* | 10/2007 | Plopski | C02F 11/10 208/117 |
| 7,909,895 | B2* | 3/2011 | Dickinson | C10G 1/00 210/605 |
| 8,043,505 | B2* | 10/2011 | Noguchi | B01D 65/08 208/424 |
| 8,299,315 | B2* | 10/2012 | Brummerstedt Iversen | B01J 21/04 44/307 |
| 8,518,219 | B2* | 8/2013 | Plopski | C02F 1/26 203/43 |
| 8,969,605 | B2* | 3/2015 | Bosetti | C02F 1/281 435/134 |
| 9,006,502 | B2* | 4/2015 | Bosetti | C10G 1/002 435/166 |
| 2004/0034262 | A1 | 2/2004 | Van De Beld | |
| 2008/0299018 | A1* | 12/2008 | Agee | C10L 1/02 422/187 |
| 2009/0325253 | A1* | 12/2009 | Ascon | C12P 3/00 435/163 |
| 2012/0111800 | A1* | 5/2012 | Collins | C02F 9/00 210/748.07 |
| 2013/0081934 | A1* | 4/2013 | New | C10B 53/00 201/8 |
| 2014/0235910 | A1* | 8/2014 | Bosetti | C02F 11/10 585/240 |

\* cited by examiner

INTEGRATED PROCESS FOR THE PRODUCTION OF BIO-OIL FROM SLUDGE COMING FROM A WASTEWATER PURIFICATION PLANT

FIELD OF THE INVENTION

The present invention concerns an integrated process for the production of bio-oil from sludge coming from a wastewater purification plant.

More specifically, the present invention concerns an integrated process for bio-oil production from sludge coming from a wastewater purification plant which comprises sending wastewater to said purification plant, subjecting the sludge coming from said purification plant to liquefaction and sending the aqueous phase obtained from said liquefaction to said purification plant.

The bio-oil (or "bio-crude") thus obtained can be advantageously used in the production of biofuels which can be used as such, or in a mixture with other automotive fuels. Otherwise, said bio-oil can be used as such (biofuel), or in a mixture with fossil fuels (combustible oil, coal, etc.), for electric energy generation.

STATE OF THE PRIOR ART

The use of biomass, in particular of vegetable-origin biomass, for energy purposes, for example as raw material for the production of biofuels, or of components which can be added to fuels, is known in the art. The biomass can hence represent a source of renewable energy as an alternative to conventional, fossil-origin raw materials generally used in fuel production.

However, the use of said biomass can divert precious food resources for animal and/or human consumption.

Efforts have hence been made in the art for the purpose of using waste and/or urban, industrial and/or agricultural residues, for energy purposes. In such respect, studies have been carried out for the purpose of using sludge coming from civil and/or industrial wastewater purification plants, for energy purposes.

As a matter of fact, the civil and/or industrial wastewater purification plants, allow to obtain sludge classified as waste which, as such, can be re-used or disposed of. However, the progressive tightening of both domestic and European laws, is creating problems in the management of the produced sludge. As a matter of fact, on the one hand, landfill disposal thereof is increasingly facing the limitations set by European directives, aimed at reducing the overall amount of waste which are buried. On the other hand, an ever growing difficulty is found in devoting all the sludge to the production of compost or of soil amendments, due to the limitations set on the levels of pollutants which can be found in the final product. Vice versa, the use of sludge in incinerators or cement factories (for example, as cement additives) implies problems of an economic nature due, for example, to the water contents thereof. As a matter of fact, the water contents of the sludge at the exit of the wastewater purifying plant (about 70%-80% by weight) remarkably lowers the calorific power thereof with the resulting need to perform a partial or total drying step before using the same in incinerators or cement factories, with consequent increases of the operating costs of the purifying plant.

For example, Molton et al., in the document "Stors: The Sludge-to-Oil Reactor System", published in EPA/600/52-86/034, June 1986, discloses the use of sludge coming from purifying plants of municipal waters for producing oil and coal, useful as fuels. In particular, said sludge is subjected to liquefaction, in the presence of soda, at a temperature ranging from 275° C. to 305° C., at a pressure ranging from about 86 bar to about 148 bar. In said document it is stated that the results of tests relating to the possibility of subjecting the wastewater coming from the liquefaction of said sludge to anaerobic digestion were negative.

International patent application WO 2009/083985 discloses a multi-step process for the treatment of organic waste comprising:

(a) drying the sludge coming from a water purifying plant for the purpose of reducing the water contents to below 15%;
(b) mixing the dried sludge with a solvent to obtain a slurry;
(c) subject the slurry obtained in step (b) to thermo-chemical liquefaction in the presence of a solvent, at a temperature ranging from about 275° C. to about 375° C. and at a pressure up to 10 atmospheres (about 10 bar), obtaining a first slurry comprising gaseous, liquid and solid products ("Slurry Product "), wherein said solvent optionally derives from a solvent recirculation stream;
(d) separating said first slurry ("Slurry Product 1") obtaining a second slurry ("Slurry Product 2") and a condensable gas containing water and other liquid fractions having a boiling point up to 250° C.;
(e) steam stripping said second slurry ("Slurry product 2") at a temperature ranging from 250° C. to 400° C., preferably ranging from 300° C. to 350° C., separating the liquid products from the solid residues converting said liquid products into vapour phase, obtaining a mixture of vapours and solid char;
(f) cooling and separating said mixture of vapours obtained in step (e) obtaining two separate streams: an oil stream and a water stream;
(g) subjecting the oil stream obtained in step (f) to vacuum distillation in order to recover the fractions having a boiling temperature ranging from 250° C. to 350° C.; and recirculating the remaining fraction having a boiling temperature above 350° C. as recirculation stream of the solvent to be used in step (b).

The above process is said to be able to convert the sludge coming from a water purifying plant into fuel and crude oil with improved yield and higher energy efficiency with respect to known processes.

International patent application WO 2009/064204 discloses an apparatus and a process for the treatment of a raw material in order to reduce the level of pollutants in said raw material or to obtain a raw product which can be used to produce fuel. In particular, a continuous process is disclosed, comprising, in succession, the following steps:

(a) preparing a feedstock in pumpable form, or a slurry from a raw material;
(b) pressurising an amount of said feedstock at a pressure ranging from 100 bar to 350 bar;
(c) transferring said pressurised feedstock to a process vessel;
(d) Increasing the temperature of said feedstock from 250° C. to 400° C. in said process vessel obtaining a pressurised stream of raw product;
(e) cooling said pressurised stream of raw product in said process vessel up to room temperature or near to room temperature; and
(f) depressurise said pressurised stream of raw product before discharging it from the system.

Said raw material can be any organic or contaminated material such as, for example, biomass, algae, sludge coming from dry cleaning processes. Said stream of raw product can be used to produce an oil-rich stream which can be used instead of crude oil or similar products, to produce diesel fuel, jet fuels, lubricant oils, petrol, or similar products.

However, the above-reported processes can exhibit some critical points such as, for example:
- use of solvents to obtain the sludge in the form of a slurry before subjecting it to liquefaction, with resulting increase of the reaction volume, increase of operating costs and need to perform periodic solvent make-up, due to the unavoidable solvent losses during the process;
- need to dry the sludge with consequent increase of costs and lengthening of process times;
- management of the waters produced during sludge liquefaction, which generally contains a part of organic material not converted into oil, with consequent reduction of the yield in terms of oil and need for a dedicated purification system of said waters;
- problems due to the need to integrate said dedicated purification system of the waters produced during the sludge liquefaction with other purification lines, with consequent increase of both overall investment and operating costs of the wastewater purification plant.

SUMMARY OF THE INVENTION

The Applicant has hence faced the problem of finding a process for the production of bio-oil from sludge coming from a wastewater purification plant which allows to integrate purification, sludge production and bio-oil production. In particular, the Applicant has faced the problem of finding a process wherein the aqueous phase obtained from the liquefaction of said sludge can be used, and, more specifically, the problem of using said aqueous phase in said wastewater purification plant.

The Applicant has now found that the production of bio-oil from sludge coming from a wastewater purification plant can be advantageously carried out through an integrated process which comprises sending the wastewater to said purification plant, subjecting the sludge coming from said purification plant to liquefaction and feeding the aqueous phase obtained from said liquefaction to said purification plant.

The above-said integrated process can afford a lot of advantages, such as, for example:
- exploitation of the sludge coming from the civil and/or industrial wastewater purification plant, as an energy vector, i.e. through its conversion into bio-oil;
- efficient and simple management of the aqueous phase obtained from sludge liquefaction, directly in the civil and/or industrial wastewater purification plant, with no need to subject said aqueous phase to further treatments, with consequent reduction of both overall investment and operating costs;
- minimisation of the amount of solid waste obtained in the wastewater purification process to be sent either to the landfill or to further treatment (for example, drying in order to use it in incinerators, or in cement factories) with resulting reduction of overall disposal costs;
- possible exploitation of the solid phase obtained from said liquefaction for the production of heat and/or electric energy which can be used to energetically supply the above-said process with resulting energy savings;
- sending the amount of oils and/or fats obtained in the preliminary treatments usually implemented in civil and/or industrial wastewater purification plants, together with sludge, to the liquefaction step (i.e. co-feeding of said oils and/or fats and of said sludge to liquefaction step), with resulting yield increase in bio-oil and zero setting of the disposal costs of said oils and/or fats.

The bio-oil thus obtained can be advantageously used in the production of bio-fuels which can be used as such, or in a mixture with other automotive fuels. Otherwise said bio-oil can be used as such (bio-fuel), or in a mixture with fossil fuels (combustible oil, coal, etc.), for the generation of electric energy or heat.

The object of the present invention is hence an integrated process for the production of bio-oil from sludge coming from a wastewater purification plant comprising the following steps:
(a) sending wastewater to said purification plant, obtaining sludge;
(b) subjecting the sludge obtained in said step (a) to liquefaction, obtaining a mixture including an oily phase consisting of bio-oil, a solid phase and an aqueous phase;
(c) sending the aqueous phase obtained in said step (b) to said purification plant.

For the purpose of the present description and of the following claims, the definitions of the numerical ranges always comprise the extremes, unless differently specified.

According to a further preferred embodiment of the present invention, said sludge can be selected from primary sludge, biologic sludge, sludge produced in civil and/or industrial wastewater purification plants, or mixtures thereof.

According to a preferred embodiment of the present invention, said sludge can be used in a mixture with other materials such, for example:
- urban solid waste selected, for example, from organic material coming from the sorted waste collection, organic material selected from not sorted urban solid waste, or mixtures thereof; or mixtures of said organic material with pruning cut-offs and/or agricultural residues;
- residues and/or scraps coming from agricultural and/or zootechnical activities;
- residues and/or scraps coming from the agricultural/food industry;
- residues and/or scraps coming from agricultural processes, from forestation and/or from silviculture;
- oily by-products such as, for example, oils and/or fats, coming from the preliminary treatment of wastewater; or mixtures thereof.

According to a particularly preferred embodiment of the present invention, said sludge can be used in a mixture with oily by-products such as, for example, oils and/or fats, coming from the preliminary treatment of wastewater. Said preliminary treatment generally consists of a number of processes mostly of a physical nature such as, for example, coarse solid screening, tearing or grinding, grit removal, oil separation, primary sedimentation.

According to a preferred embodiment of the present invention, said urban solid waste, and/or said residues and/or scraps coming from agricultural and/or zootechnical activities, and/or said residues and/or scraps coming from the agricultural/food industry, and/or said residues and/or scraps coming from agricultural processes, from forestation and/or from silviculture, or mixtures thereof, can be treated subjecting them to a preliminary grinding or size-sorting process before undergoing the liquefaction step (b).

According to a preferred embodiment of the present invention, said liquefaction step (b) can be carried out at a temperature ranging from 150° C. to 350° C., preferably ranging from 250° C. to 320° C.

According to a preferred embodiment of the present invention, said liquefaction step (b) can be carried out at a pressure ranging from 5 bar to 170 bar, preferably ranging from 35 bar to 120 bar.

According to a preferred embodiment of the present invention, said liquefaction step (b) can be carried out for a time ranging from 5 minutes to 240 minutes, preferably ranging from 15 minutes to 180 minutes.

Said liquefaction step (b) can be carried out in reactors known in the art, such as, for example autoclaves, or tubular reactors.

Said liquefaction step (b) can be carried out operating in different ways such as, for example, discontinuously in batches, or continuously, preferably continuously.

Assuming that the thermal energy necessary in said liquefaction step (b) can derive totally or partially from the heat recovery (for example, from the exploitation of the solid phase obtained in said liquefaction step (b)) or from the combustion of conventional energy vectors, for example methane gas, LPG, mineral oil, coal, etcetera, it is not ruled out that the thermal energy can derive from other renewable sources such as, for example, sunlight, or biomass.

The oily phase, the solid phase and the aqueous phase included in the mixture obtained in said liquefaction step (b) can be separated through techniques known in the art such as, for example, gravitational separation (for example, sedimentation, decanting), filtering, centrifugation. Preferably, said phases are separated by gravitational separation.

Moreover, during said liquefaction step (b) a gaseous phase is formed, equal to about 10% by weight-25% by weight with respect to the weight (dry weight) of said sludge or, in the case in which, as stated above, said sludge is used in a mixture with other materials, with respect to the weight (dry weight) of said sludge+said other materials. Said gaseous phase consists mainly of carbon dioxide (about 80% in moles-95% in moles) and of a mixture of hydrocarbons having from 1 to 4 atoms of carbon or of other gases (about 10% in moles to 20% in moles). Such gaseous phase, after separation, which separation can be carried out for example by depressurisation of the pressurised vessel in which said liquefaction step (b) is carried out, before sending the mixture (oily phase+solid phase+aqueous phase) obtained from said liquefaction step (b) to separation, is generally sent to further treatments in order to exploit the combustible organic component thereof.

The solid phase obtained after separation generally comprises organic and/or inorganic residues. Said solid phase can be disposed of in a landfill, or can be exploited by direct combustion obtaining heat and/or electric energy which can be used In said liquefaction step (b), and ashes which can be sent to a landfill, or it can be used as inorganic starting material in the building industry, or in the ceramic industry.

The aqueous phase obtained after separation comprises part of the dissolved organic material coming from said sludge and other inorganic compounds (for example, nitrates, phosphates, carbonates). Generally speaking, said aqueous phase can have a content of dissolved organic material higher than or equal to 10% by weight, preferably ranging from 20% by weight to 40% by weight, with respect to the total weight of the dry fraction of said sludge, or, in the case in which, as stated above, said sludge is used in a mixture with other materials, with respect to the total weight of the dry fraction of said sludge+said other materials.

The integrated process object of the present invention allows to produce bio-oil with a global yield ranging from 15% to 50%, said yield being calculated with respect to the total weight of the dry fraction of the initial sludge or, in the case in which, as stated above, said sludge is used in a mixture with other materials, with respect to the total weight of the dry fraction of said sludge+said other materials.

It must be noted that the integrated process object of the present invention, due to the feeding of the aqueous phase coming from the liquefaction step (b) directly to the wastewater purification plant, allows not to subject said aqueous phase to further processes before being disposed of or used, with a consequent reduction of both investment and operating costs.

Moreover it must be noted that the opportunity of using the oils and/or fats coming from the preliminary treatment generally performed in wastewater purification plants allows to obtain an increase of the yield in bio-oil. Said increase can range from 2% to 10%, said yield increase being calculated with respect to the total weight of the initial dry fraction of the sludge or, in the case in which, as stated above, said sludge is used in a mixture with other materials, with respect to the total weight of the dry fraction of said sludge+said other materials.

Moreover, the liquefaction step (b) allows to minimise the amount of solid waste obtained in the purification process of the wastewater to be sent either to the landfill or to a further treatment (for example, to drying), with the resulting reduction of overall disposal costs.

The bio-oil obtained through the above-said integrated process can be sent to the subsequent processing phases in order to convert it, for example, into bio-fuel through processing known in the art such as, for example, hydrogenation or cracking.

BRIEF DESCRIPTION OF THE DRAWINGS

Further features and advantages of the invention will in any case be more evident from the following detailed description of preferred embodiments of the same, given purely as a non-limiting example, with reference to the attached drawings, wherein.

Figure 1:
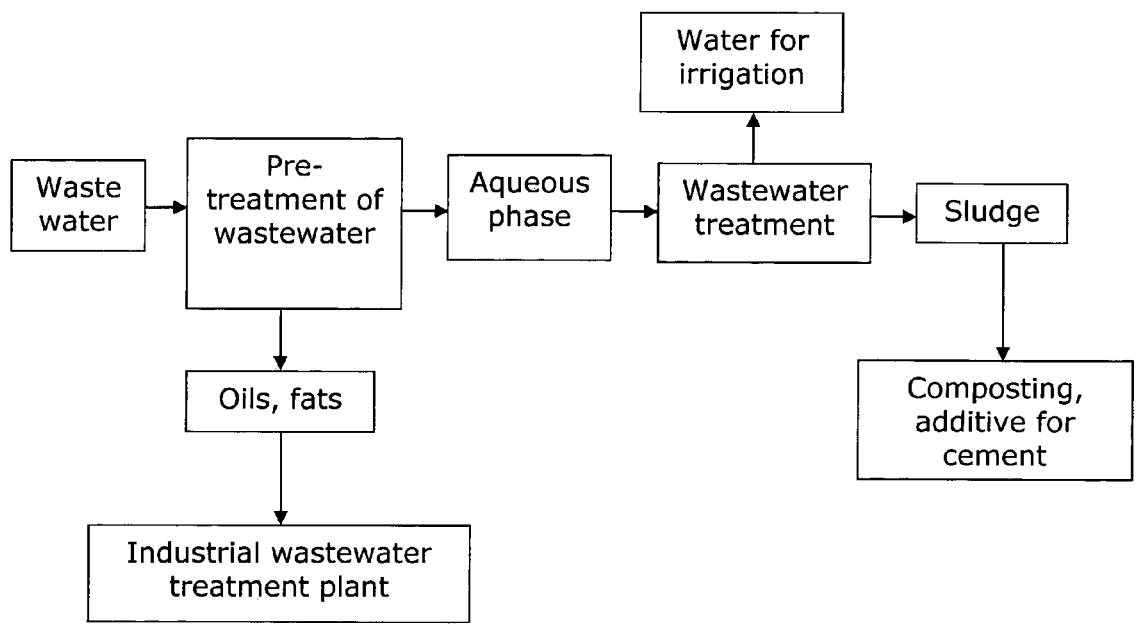
FIG. 1, for comparison, shows an embodiment of a civil wastewater purification plant.

According to a typical implementation of the purification process of civil wastewater, illustrated in FIG. 1, urban wastewater is fed to a preliminary treatment (for example, coarse solid screening, grit removal, oil separation) obtaining oils and/or fats, which are fed to a processing plant of industrial wastewater, and an aqueous phase which is sent to wastewater processing, obtaining sludge which can be used, for example, for composting, or as additives for cements, and water for irrigation.

DETAILED DESCRIPTION OF THE PREFERRED EMBODIMENTS

According to a typical implementation of the integrated process object of the present invention, urban wastewater is sent to a preliminary treatment (for example, coarse solid screening, grit removal, oil separation) obtaining oils and/or fats and a first aqueous phase. Said first aqueous phase is sent to wastewater treatment obtaining water for irrigation and sludge. The sludge thus obtained, in a mixture with the oils and/or the fats obtained from said preliminary treatment, is sent to the liquefaction step obtaining a mixture including an oily phase consisting of bio-oil, a solid phase and a second aqueous phase. Said mixture is fed to the phase separation step obtaining: an oily phase consisting of bio-oil, a solid phase comprising organic and/or inorganic residues and a second aqueous phase comprising part of the dissolved organic material coming from said sludge and other inorganic compounds (for example, nitrates, phosphates, carbonates). Said solid phase can be disposed of in a landfill, or it can be exploited by direct combustion obtaining heat and/or electric energy which can be used in said liquefaction step (b), and ashes which can be sent to the landfill, or it can be used as inorganic starting material in the building industry, or in the ceramic industry. Said second aqueous phase is directly sent to the wastewater processing.

During liquefaction a gaseous phase (not shown in FIG. 2) comprising $CO_2$, gaseous hydrocarbons having from 1 to 4 carbon atoms, or other gases is also produced, which phase can be separated, for example, by depressurisation of the pressurised vessel in which said liquefaction is carried out, before sending the mixture (oily phase+solid phase+second aqueous phase) obtained after liquefaction to the phase separation section. The gaseous phase thus obtained can be fed to further processing in order to exploit the combustible organic component thereof.

Figure 2:
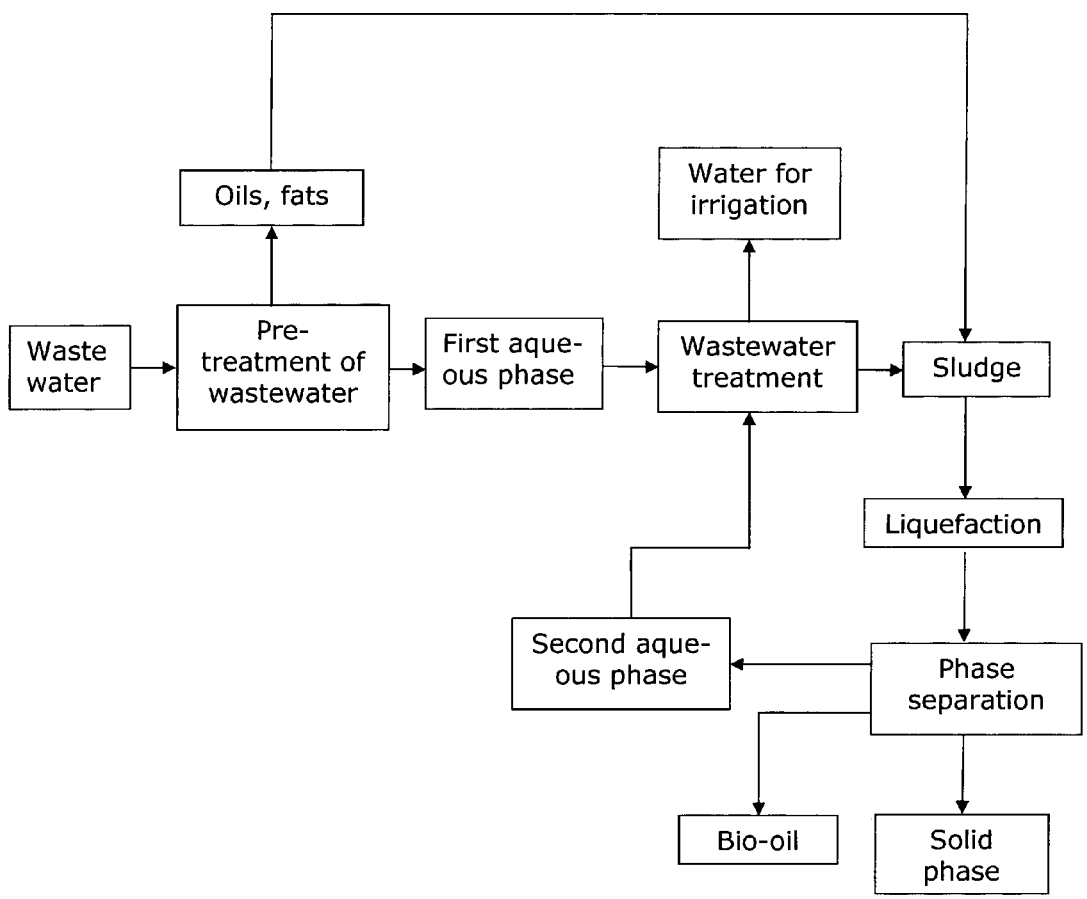
FIG. 2 shows an embodiment of a purification plant to implement the integrated process object of the invention.

The bio-oil thus obtained can be fed to subsequent processing phases to transform it, for example, into bio-fuel through further treatments, for example, hydrogenation or cracking (not shown In FIG. 2).

In order to better understand the present invention and to put into practice the same, in the following some non-limiting illustrative examples of the same are reported.

EXAMPLE 1 (COMPARATIVE)

A reference plant for urban wastewater purification ("white" and "black" waters, rainwaters) has been used, which processes 100 million m³/year of wastewater. The wastewater has undergone a preliminary treatment flowing through coarse solid screening, grit removal and oil separation sections. From these sections there have been obtained, among the other by-products, about 282 ton/year of oils and fats which have been sent to processing plant of industrial wastewater and a first aqueous phase. Said first aqueous phase has been sent to wastewater processing obtaining sludge and purified water for irrigation. The sludge obtained from the above-said processing (aerobic bacterial oxidation) has been collected obtaining 46,000 ton/year of sludge (at 32% dry contents) which have been sent for composting.

EXAMPLE 2 (INVENTION)

A purification plant of urban wastewater ("white" and "black" waters, rainwaters) has been used, which processes 100 million m³/year of wastewater, integrated with a bio-oil production plant through a liquefaction step.

The 46,000 ton/year of wet sludge and the 282 ton/year of oils and fats have been unified and sent, continuously, to the liquefaction step, i.e. to a tubular reactor. The liquefaction step has been carried out at 310° C. (reactor inner temperature), at 110 bar (reactor inner pressure), for about 1 hour.

The reaction crude has been separated, continuously, in a gravitational separator, obtaining the following phases:
- an aqueous phase (i.e. second aqueous phase) (31,100 ton/year) which has been sent directly to said purification plant of urban wastewater and which has turned out to be equal to 0.03% in volume compared to the total volume of the wastewater processed in said purification plant (said sending implied no change in the performance of said purification plant, since waters fully complying with the specifications required by the law have been obtained);
- a solid phase consisting of a solid residue (7,916 ton/year) which has been sent to a waste-to-energy plant (said solid phase has turned out to represent 17% by weight compared to the total weight of the solids which should have been processed in a purification plant non integrated with the production of bio-oil according with the present invention);
- an oily phase consisting of bio-oil (5,690 ton/year—equal to about 118 barrels/day) usable in the automotive field;
- a gaseous phase which has been sent to energy exploitation based on the residual calorific power thereof.

EXAMPLE 3 (INVENTION)

An urban wastewater purification plant ("white" and "black" waters, rainwater) has been used, which processes 100 million m3/year of wastewater integrated with a plant for the production of bio-oil through a liquefaction step. The amount of urban waters is produced by an urban area having about 1-million population equivalent. Said urban area produces also, as sorted waste collection, about 90,000 ton/year of organic fraction of solid urban waste (FORSU) at 35% dry contents.

The 46,000 ton/year of wet sludge, the 282 ton/year of oils and fats and the 90,000 ton/year of FORSU have been unified and sent, continuously, to the liquefaction step, i.e. to a tubular reactor. The liquefaction step has been carried out at 310° C. (reactor inner temperature), at 110 bar (reactor inner pressure), for about 1 hour.

The reaction crude has been separated, continuously, In a gravitational separator, obtaining the following phases:
- an aqueous phase (i.e. second aqueous phase) (94,300 ton/year) which has been sent directly to said purification plant of urban wastewater and which has turned out to be equal to 0.08% in volume compared to the total volume of the wastewater processed in said purification plant (said sending implied no change in the performance of said purification plant, since waters fully complying with the specifications required by the law have been obtained);
- a solid phase consisting of a solid residue (13,435 ton/year) which has been sent to a waste-to-energy plant (said solid phase has turned out to represent 10% by weight compared to the total weight of the solids which should have been processed in a purification plant non integrated with the production of bio-oil and with the sorted waste collection (FORSU) according to the present invention);
- an oily phase consisting of bio-oil (24,494 ton/year—equal to about 500 barrels/day) usable in the automotive field;
- a gaseous phase which has been sent to energy exploitation based on the residual calorific power thereof.

EXAMPLE 4

In a laboratory plant with active sludge (volume: 4 litres) the sludge coming from a purification plant of urban wastewater containing 6 g/litre of MLTSS (total suspended solids) has been loaded.

Then the system has been fed with a liquid substrate which simulates the domestic sewage having the following characteristics:

saccharose=0.4 g/litre;
buffer solution at pH=7;
loading COD ("Chemical Oxygen Demand")=320 mg/litre.

Once a constant degrading capacity (acclimatisation) has been verified, the charge to be purified has been added with the second aqueous phase coming from the liquefaction of the sludge+oils and fats obtained as described in Example 2, at a concentration of 0.03% compared to the total aqueous charge (sludge load equal to 0.016 $Kg_{BOD}/Kg_{MLTSS}$).

The whole has been maintained at room temperature for 7 days, controlling the purifying capacity of the system through the analysis of the outgoing COD. The purifying capacity of the system in the entire period has been kept, providing purified water complying with legal requirements with an outgoing COD well below 100 mg/litre.

Then, both the flow rate and the concentration of the aqueous phase have been increased up to 0.1 $Kg_{BOD}/Kg_{MLTSS}$, corresponding to a concentration of incoming waters equal to 0.3% compared to the total aqueous charge (i.e. 10 times above the initial one), in order to verify both the maximum working limit of the system and any load stress. The test has lasted in total about one month with no alteration in the purifying capacity of said purification plant of urban wastewater.

The invention claimed:

1. Integrated process for the production of bio-oil from sludge coming from a wastewater purification plant, comprising the following steps:
   (a) sending wastewater to said purification plant obtaining sludge;
   (b) directly subjecting the sludge obtained in said step (a) to liquefaction obtaining a mixture comprising an oily phase consisting of bio-oil, a solid phase and an aqueous phase; and
   (c) sending the aqueous phase obtained in said step (b) to said purification plant.

2. Integrated process according to claim 1, wherein said sludge is selected from primary sludge, biologic sludge produced in purification plants of civil and/or industrial wastewater, or mixtures thereof.

3. Integrated process according to claim 1, wherein said sludge is used in a mixture with other materials selected from the group consisting of:
   urban solid waste selected from organic material coming from the sorted waste collection, organic material selected from not sorted urban solid waste, or mixtures thereof; or mixtures of said organic material with pruning cut-offs and/or agricultural residue;
   residue and/or scraps coming from agricultural and/or zootechnical activities;
   residue and/or scraps coming from the agricultural/food industry;
   residue and/or scraps coming from agricultural processes, from forestation and/or from silviculture; and
   oily by-products such as oils and/or fats, coming from the preliminary treatment of wastewater;
   mixtures thereof.

4. Integrated process according to claim 3, wherein said sludge is used in a mixture with oily by-products coming from the preliminary treatment of wastewater.

5. Integrated process according to claim 3, wherein said urban solid waste, and/or said residue and/or scraps coming from agricultural and/or zootechnical activities, and/or said residue and/or scraps coming from the agricultural/food industry, and/or said residue and/or scraps coming from agricultural processes, from forestation and/or from silviculture, or mixtures thereof, are treated by subjecting them to a preliminary grinding or size-sorting process before subjecting them to the liquefaction step (b).

6. Integrated process according to claim 1, wherein said liquefaction step (b) is carried out at a temperature ranging from 150° C. to 350° C.

7. Integrated process according to claim 6, wherein said liquefaction step (b) is carried out at a temperature ranging from 250° C. to 320° C.

8. Integrated process according to claim 1, wherein said liquefaction step (b) is carried out at a pressure ranging from 5 bar to 170 bar.

9. Integrated process according to claim 8, wherein said liquefaction step (b) is carried out at a pressure ranging from 35 bar to 120 bar.

10. Integrated process according to claim 1, wherein said liquefaction step (b) is carried out for a time ranging from 5 minutes to 240 minutes.

11. Integrated process according to claim 10, wherein said liquefaction step (b) is carried out for a time ranging from 15 minutes to 180 minutes.

12. Integrated process according to claim 1, wherein said oily phase, said solid phase and said aqueous phase included in the mixture obtained in said step (b) are separated by gravitational separation, filtering, or centrifugation.

13. Integrated process for the production of bio-oil from sludge coming from a wastewater purification plant, consisting essentially of:
   (a) sending wastewater to said purification plant obtaining sludge;
   (b) subjecting the sludge obtained in said step (a) to liquefaction obtaining a mixture comprising an oily phase consisting of bio-oil, a solid phase and an aqueous phase; and
   (c) sending the aqueous phase obtained in said step (b) to said purification plant.

* * * * *